(No Model.) 2 Sheets—Sheet 1.
P. N. BOUCHER.
ROLLER BEARING FOR RAILWAY CAR AXLES.
No. 553,773. Patented Jan. 28, 1896.
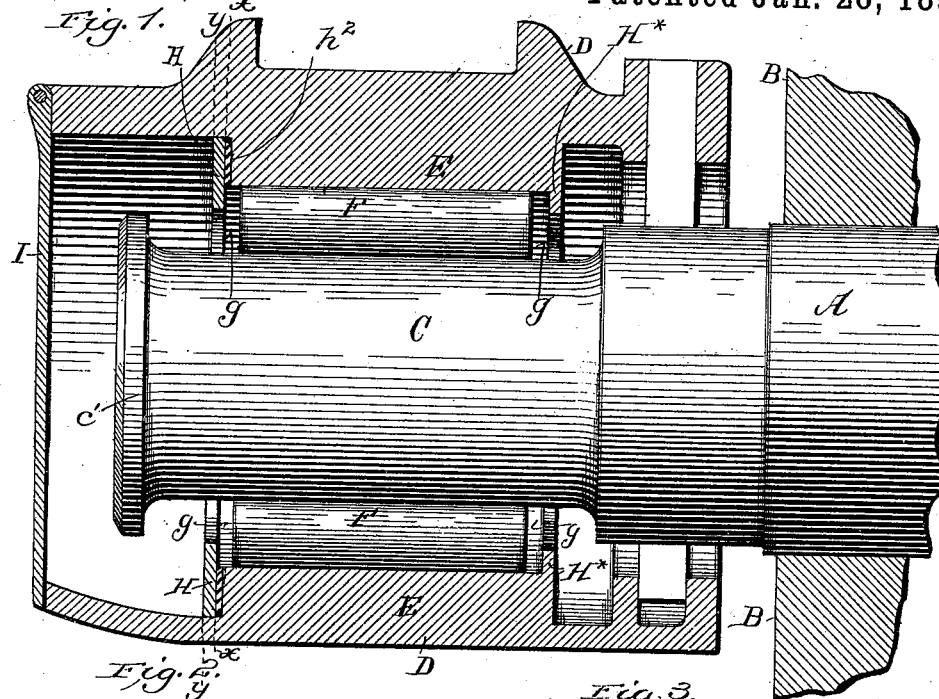
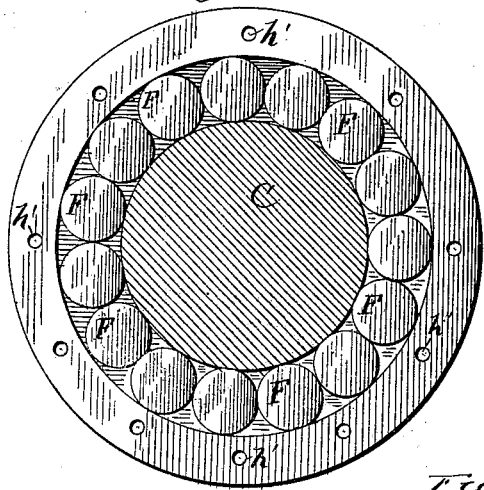
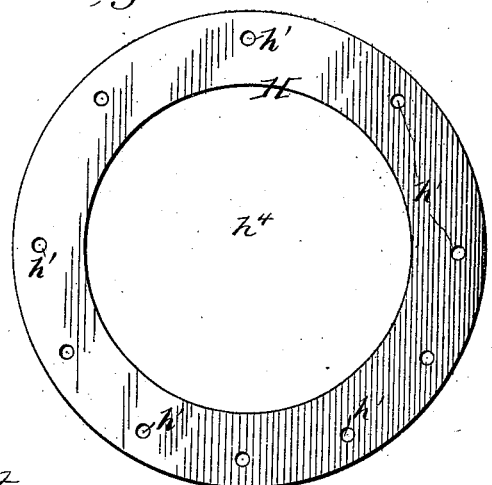
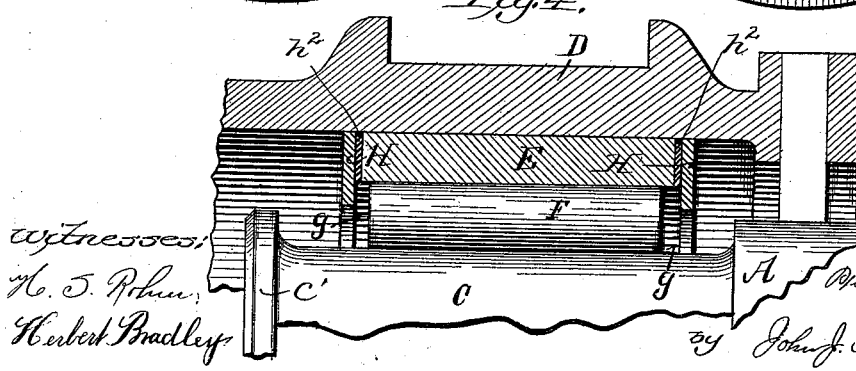
Witnesses:
H. S. Rohm
Herbert Bradley
Inventor:
Pierre Najaire Boucher
by John J. Halstead & Son
his attys (No Model.) 2 Sheets—Sheet 2.

P. N. BOUCHER.
ROLLER BEARING FOR RAILWAY CAR AXLES.

No. 553,773. Patented Jan. 28, 1896.

Witnesses:
Harry B. Rohrer.
Herbert Bradley.

Pierre Nazaire Boucher.
Inventor;
by John J. Halsted & Son
his att'ys.

UNITED STATES PATENT OFFICE.

PIERRE NAZAIRE BOUCHER, OF SHERBROOKE, CANADA.

ROLLER-BEARING FOR RAILWAY-CAR AXLES.

SPECIFICATION forming part of Letters Patent No. 553,773, dated January 28, 1896.

Application filed May 15, 1895. Serial No. 549,398. (No model.)

*To all whom it may concern:*

Be it known that I, PIERRE NAZAIRE BOUCHER, a subject of the Queen of Great Britain, residing at Sherbrooke, Province of Quebec, Canada, have invented certain new and useful Improvements in Roller-Bearings for Railway-Car Axles; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to a special construction of the journal-bearings and journal-boxes of railway-car axles, and whether used with rollers or with balls, and in which construction the usual "brasses" within the box are dispensed with and their expense saved, and also there is a great saving of oil and prevention of its usual waste and loss.

Figure 5:
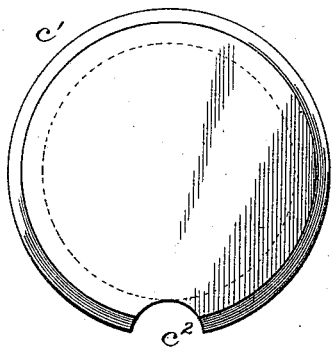
Figure 6:
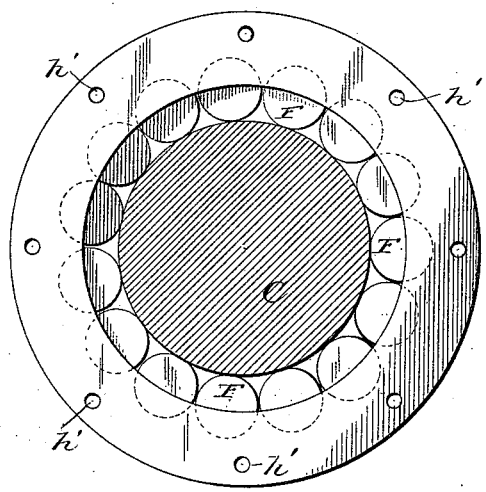

The particulars of the construction will be now made clear from the following:

In the drawings, Figure 1 illustrates a central longitudinal section of a journal-box having an interior sleeve made integral with the box, showing, also, the journal end of a car-axle and its adjacent parts, including my improvements. Fig. 2 is a cross-section in the line $x\,x$ of Fig. 1 of the rollers and sleeve, the washer being removed; Fig. 3, a plan of one of the washers detached; Fig. 4, a fragmentary detail showing the sleeve made separate from the box; Fig. 5, an end view of the journal, and Fig. 6 a cross-section in the line $y\,y$ of Fig. 1.

A indicates the car-axle. The line B B shows the position of the outer face of a car-wheel; C, the axle-journal; D, the axle-box.

E is a sleeve, which I either cast integral with the box, as shown in Fig. 1, or in some cases, if desired, it may be made separate therefrom and loose when in its place, as shown in Fig. 4, and it fills the space usually allotted to the ordinary brass and wedge, which I dispense with altogether.

F F indicate the circular series of rollers which surround the journal and which lie directly upon it and between it and the sleeve and in contact for their whole lengths both with such journal and sleeve. The sleeve, however, is made longer than these rollers, as shown, to leave at each end of each roller a clear space, as indicated at $g\,g$. The relative length of roller to the sleeve should be about four and one-half to five and one-fourth inches.

H H* are washers which are at each end of the sleeves, as shown. When the box and sleeve are cast solid or integral, the washer nearest the car-wheel is also cast integral with them, as shown in Fig. 1, and they serve not only to hold the rollers in their proper places, but at the same time they have another duty or function—namely, to constitute in conjunction with the sleeve a chamber or reservoir $g$ for oil, and whereby at every turn these rollers may be dipped in the oil in the box. The separate or attached washers, which may be a continuous ring or be divided into sections of a ring, are removably secured in any preferred manner—such, for instance, as by screws or other fastenings through holes $h'$. Thin rubber washers or packers $h^2$ are used between the sleeve and the washers when the latter are screwed on. They prevent the oil from running out, and may be a little less in width than the sleeve, so as to be adjusted with ease.

The oil may be introduced into the box in any well-known way.

I make the journal-box somewhat shorter than usual and not quite so deep vertically, and with its end open sufficiently to admit the washers and rollers. The rollers are readily inserted by passing them severally into a notch $c^2$ cut in the rim or end of the journal.

Instead of rollers, balls may be used, if desired—a set or row of balls in place of each, any, or all of the rollers.

If the sleeve be made separate and inserted loosely, it takes the place of the customary brass and wedge, as it does also when made integral with the box.

I is a cover placed at the end of the box to be fastened to its top in any well-known manner.

In making a new journal or new axle its end rim or flange $c'$ is omitted or made of lesser diameter, so that the washers may be made with a smaller central opening and will reach closer to the axle; but in existing axles having the usual rim or flange $c'$ the washers need of course a larger central opening, like $h^4$, sufficient to permit the washer to be passed over such rim, and which is easily done by slanting the washer (when putting it on) so as to first insert its lower part into the box, and then passing its top part over the flange.

It will be seen that comparatively little oil is needed in my improved construction, as it is held in the chamber-space $g$, and the friction will be greatly reduced, as all the rollers or balls are continuously dipped in the oil at the bottom of this chamber, and consequently less motive power is required to run a train of cars and hot boxes are not likely to occur. Oil can be admitted with an oil-can into the space near the axle, as the outer washer does not touch the axle.

With the loose sleeve the box may have about two inches space left at the bottom of the journal-box, so that the washers can be put in without any trouble or inconvenience.

I would repeat that the rollers (or balls, if used) have no journals, but are left loose and unattached, and that therefore I not only dispense with any ring or other support having journal-bearings for the rollers, but I also get rid of all friction incident to such rings or to their revolving, and of all friction of and oiling of such journals, and, furthermore, the space heretofore occupied by such rings when used is in my construction left entirely open and free and always well lubricated by the oil in the box.

I claim—

1. A journal-box of a railway-car having an interior sleeve integral therewith and projecting inward from the main body of the box, and having its bore in which its friction-rollers are lodged, materially less than the interior perimeter of the main body of the box, such projection affording a right-angled annular shoulder to receive a removable ring, and provided with screw-holes for fastening such rings thereto, combined with such ring and with said rollers lodged between the sleeve and the journal, but not extending the full length of the sleeve, all substantially as and for the purposes set forth.

2. A journal-box of a railway-car having integral therewith an interior sleeve projecting inward from the body of the box and thus increasing its strength and thickness, the end of such sleeve serving as a bed for a ring, combined with the ring secured to such end and projecting inward beyond such sleeve, and the inner end of such sleeve having integral with it a circular flange to correspond with said outer ring, such removable ring and fixed flange serving to hold between them friction-rollers and the lubricating-oil, all substantially as set forth.

3. In combination with a railway-car axle-journal and with its journal-box, a sleeve within the same having its ends provided with screw-holes, rings serving as flanges screwed on such ends, a continuous circle of loose rollers of uniform diameters, each and all in contact with the journal and with the sleeve, the rollers being shorter than the distance between such end rings and serving not only to keep the rollers in place but also constituting with the sleeve a chamber for oil.

4. In combination with a journal-box having an enlarged mouth to admit the described ring and to permit its being screwed to the end of a sleeve within the box, the said sleeve having screw-holes in its annular end, and the short rollers located in a space longer than themselves between the two end rings all as set forth.

5. In combination, the journal-box, its interior sleeve having its ends provided with screw-holes, the flanged rings on such ends, the complete circle of rollers all of uniform size and lengths and shorter than the distance between the flanges, the oil-chamber constituted of the space between the roller ends and the flanges, and the elastic packing narrower than the flange and between it and the sleeve ends, all as set forth.

PIERRE NAZAIRE BOUCHER.

Witnesses:
J. T. Q. ARCHAMBAULT,
D. C. BELIVEAU.